(12) United States Patent
Yun et al.

(10) Patent No.: US 10,923,284 B2
(45) Date of Patent: Feb. 16, 2021

(54) CAPACITOR COMPONENT

(71) Applicant: SAMSUNG ELECTRO-MECHANICS CO., LTD., Suwon-si (KR)

(72) Inventors: Geum Hee Yun, Suwon-si (KR); Hwa Young Lee, Suwon-si (KR); Kwan Yeol Paek, Suwon-si (KR); Jeong Wook Seo, Suwon-si (KR); Ha Yong Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 62 days.

(21) Appl. No.: 16/441,466

(22) Filed: Jun. 14, 2019

(65) Prior Publication Data

US 2020/0185153 A1    Jun. 11, 2020

(30) Foreign Application Priority Data

Dec. 11, 2018  (KR) ........................ 10-2018-0158909

(51) Int. Cl.
*H01G 4/30*    (2006.01)
*H01G 4/012*   (2006.01)
*H01G 4/12*    (2006.01)

(52) U.S. Cl.
CPC ............... *H01G 4/30* (2013.01); *H01G 4/012* (2013.01); *H01G 4/12* (2013.01)

(58) Field of Classification Search
CPC ............ H01G 4/30; H01G 4/12; H01G 4/248; H01G 4/012; H01G 4/1209; H01G 4/232;
(Continued)

(56) References Cited

U.S. PATENT DOCUMENTS

2008/0073108 A1    3/2008   Saito et al.
2013/0201601 A1*   8/2013   Nishisaka ............ H01G 4/2325
                                                    361/301.4
(Continued)

FOREIGN PATENT DOCUMENTS

JP         2008-85280 A       4/2008
KR    10-2014-0021416 A       2/2014

*Primary Examiner* — Michael P McFadden
(74) *Attorney, Agent, or Firm* — Morgan, Lewis & Bockius LLP

(57) ABSTRACT

A capacitor component includes a body including dielectric layers and internal electrodes alternately arranged with the dielectric layers; and external electrodes including electrode layers disposed on the body and connected to the internal electrodes, first conductive resin layers disposed on the electrode layers, and second conductive resin layers disposed on the first conductive resin layers, wherein the first and second conductive resin layers include a metal powder and a base resin, the first conductive resin layers have a lower metal powder content than the second conductive resin layers, the metal powder includes one or more of flake-type powder particle and spherical-type powder particle, and a weight ratio of the flake-type powder particle in the metal powder contained in the first conductive resin layers is 60% or more, and a weight ratio of the spherical-type powder particle in the metal powder contained in the second conductive resin layers is 50% or more.

15 Claims, 4 Drawing Sheets

(58) Field of Classification Search
CPC ... H01G 4/0085; H01G 4/1227; H01G 4/2325
See application file for complete search history.

(56) References Cited

U.S. PATENT DOCUMENTS

2014/0043724 A1    2/2014   Kang et al.
2015/0090483 A1*   4/2015   Moon ................. H01G 4/2325
                                                                     174/260

* cited by examiner

CAPACITOR COMPONENT

CROSS-REFERENCE TO RELATED APPLICATION

This application claims benefit of priority to Korean Patent Application No. 10-2018-0158909 filed on Dec. 11, 2018 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), a capacitor component, may be a chip type capacitor which is mounted on the printed circuit boards of various electronic products and plays a role in charging or discharging electricity therein or therefrom, for example, an imaging device such as a liquid crystal display (LCD), a plasma display panel (PDP), and the like, a computer, a smartphone, a mobile phone, or the like.

Such a multilayer ceramic capacitor may be used as a component of various electronic devices, due to having a relatively compact size, relatively high capacity, relative ease of mounting, and the like. As electronic devices such as computers and mobile devices become smaller in size and higher in power output, demand for miniaturization and higher capacity in multilayer ceramic capacitors are increasing.

In the meantime, as interest, in industry, in electric/electronic components has recently increased, multilayer ceramic capacitors have also been required to have high reliability and high capacity in order to be used in vehicles or infotainment systems.

A problem in such high reliability may occur due to penetration of plating liquid occurring during the process, occurrence of cracks due to external impacts, or the like.

In order to solve the above problems, a resin composition containing a conductive material has been applied between an electrode layer and a plated layer of an external electrode so as to form a conductive resin layer, thereby absorbing external impacts and preventing the penetration of plating liquid, to improve reliability.

However, when the conductive resin layers was applied between the electrode layer and the plated layer of the external electrode, there were problems, in that a lifting phenomenon occurred between the electrode layer and the resin layer, and a non-plating phenomenon occurred between the plated layer and the resin layer.

In addition, it has been susceptible to bending strength, such that cracks occurred inside the chip, and adhesion on a ceramic substrate and a silicon substrate were not good.

Therefore, in order to secure higher reliability, a relatively high level of crack resistance property is required.

SUMMARY

An aspect of the present disclosure is to provide a capacitor component with improved crack resistance.

According to an aspect of the present disclosure, a capacitor component includes a body including dielectric layers and internal electrodes alternately arranged with the dielectric layers; and external electrodes including electrode layers disposed on the body and connected to the internal electrodes, first conductive resin layers disposed on the electrode layers, and second conductive resin layers disposed on the first conductive resin layers, wherein the first and second conductive resin layers include a metal powder and a base resin, the first conductive resin layers have a lower metal powder content than the second conductive resin layers, the metal powder includes one or more of a flake-type powder particle and spherical-type powder particle, and a weight ratio of the flake-type powder particle in the metal powder contained in the first conductive resin layers is 60% or more, and a weight ratio of the spherical-type powder particle in the metal powder contained in the second conductive resin layers is 50% or more.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
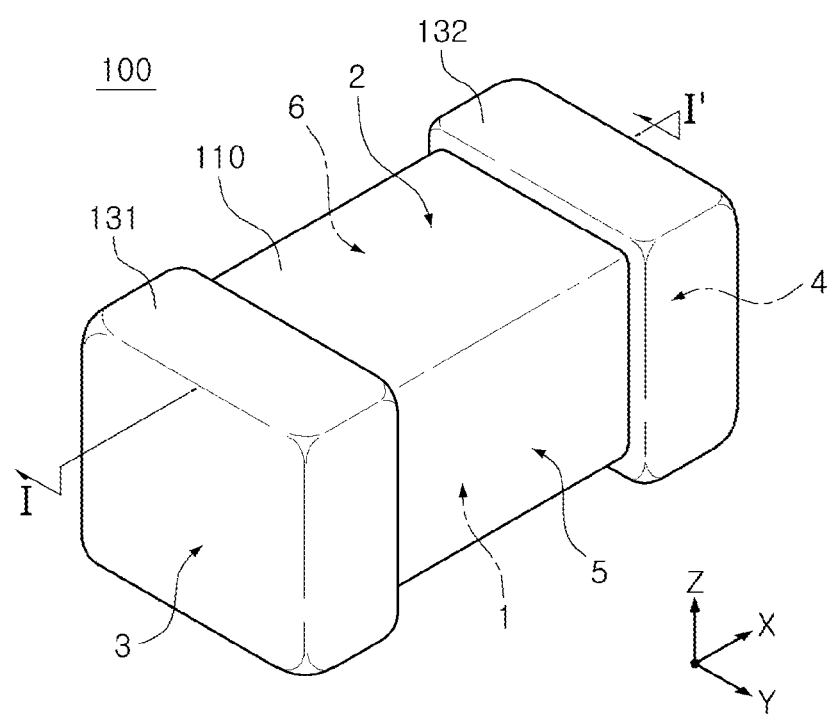
FIG. 1 is a perspective view schematically illustrating a capacitor component according to an embodiment of the present disclosure.

Hereinafter, embodiments of the present disclosure will be described as follows with reference to the attached drawings.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification. Further, throughout the specification, when an element is referred to as "comprising", it means that it may include other elements as well, rather than excluding other elements, unless specifically stated otherwise.

In the drawing, an X direction may be defined as a second direction, an L direction or a longitudinal direction, a Y direction may be defined as a third direction, a W direction or a width direction, and a Z direction may be defined as a first direction, a stacking direction, a T direction, or a thickness direction.

Capacitor Component

FIG. 1 is a perspective view schematically illustrating a capacitor component according to an embodiment of the present disclosure.

Figure 2:
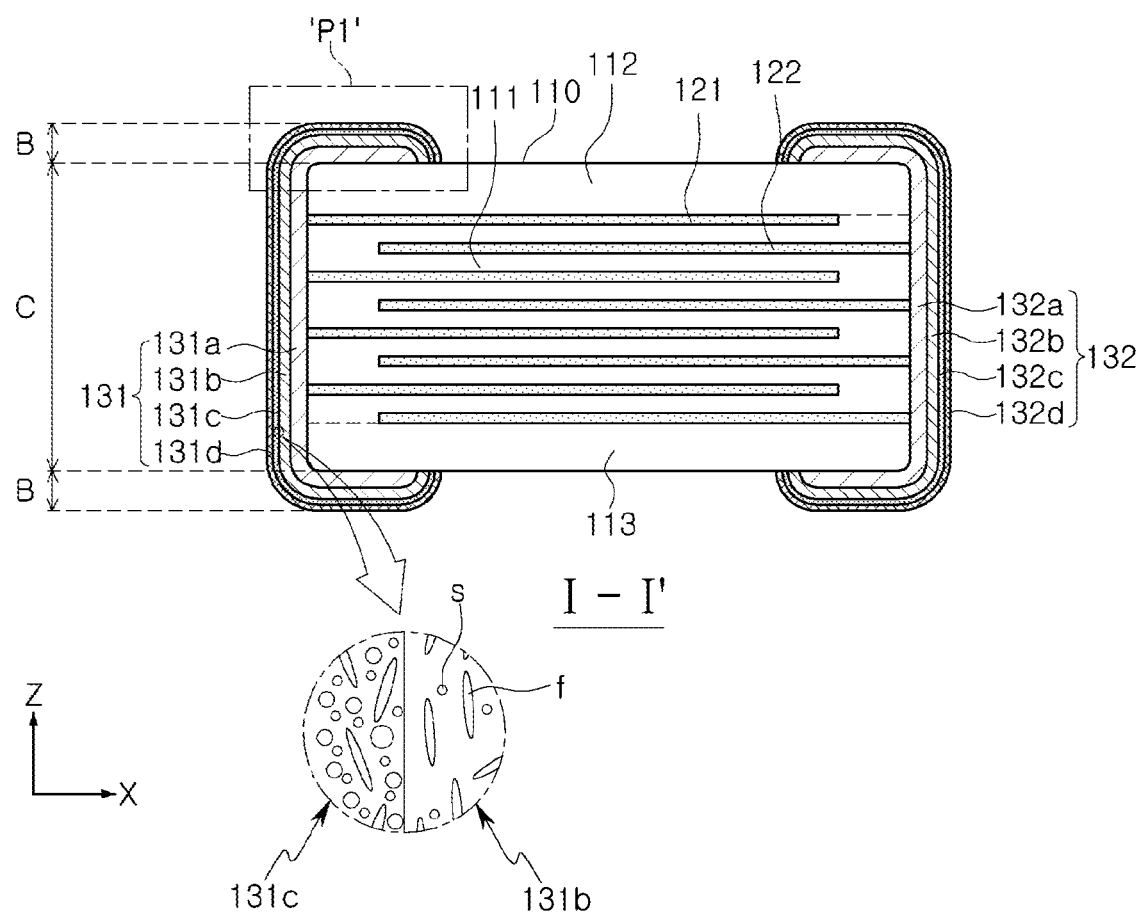
FIG. 2 is a schematically cross-sectional view taken along line I-I' of FIG. 1.

FIG. 2 is a schematically cross-sectional view taken along line I-I' of FIG. 1.

Figure 3:
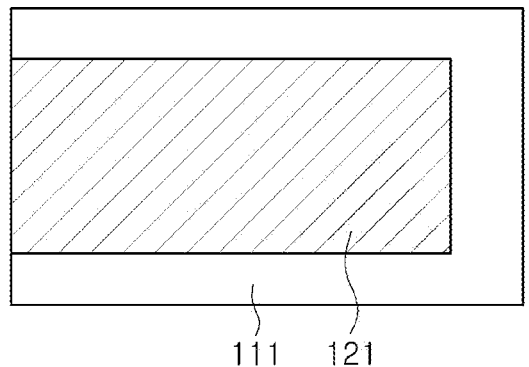
FIG. 3 illustrates a dielectric layer on which a first internal electrode is printed.

FIG. 3A illustrates a dielectric layer on which a first internal electrode is printed, and FIG. 3B illustrates a dielectric layer on which a second internal electrode is printed.

Figure 4:
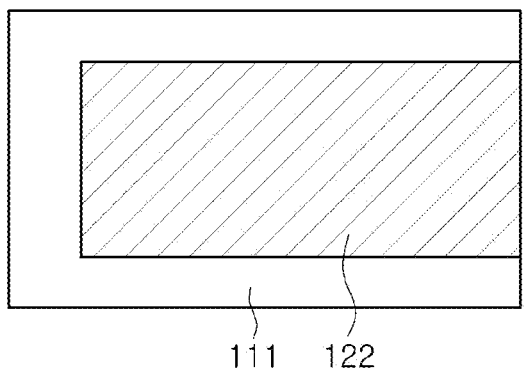
FIG. 4 illustrates a dielectric layer on which a second internal electrode is printed.

FIG. 4 is an enlarged view illustrating area P1 in FIG. 2.

Hereinafter, a capacitor component according to an embodiment of the present disclosure will be described in detail with reference to FIGS. 1 to 4.

A capacitor component 100 according to an embodiment of the present disclosure may include a body 110 including dielectric layers 111 and internal electrodes 121 and 122 alternately arranged with the dielectric layers; and external electrodes 131 and 132 including electrode layers 131a and 132a disposed on the body and connected to the internal electrodes, first conductive resin layers 131b and 132b disposed on the electrode layers, and second conductive resin layers 131c and 132c disposed on the first conductive resin layers, wherein the first and second conductive resin layers 131b, 132b, 131c, and 132c include a metal powder and a base resin, and the first conductive resin layers 131b and 132b have a lower metal powder content than the second conductive resin layers 131c and 132c. The metal powder includes one or more of flake-type powder particle (f) and spherical-type powder particle (s), and a weight ratio of the flake-type powder particle (f) in the metal powder contained in the first conductive resin layers 131b and 132b is 60% or more, and a weight ratio of the spherical-type powder particle (s) in the metal powder contained in the second conductive resin layers 131c and 132c is 50% or more.

The body 110 may have the dielectric layers 111 and the internal electrodes 121 and 122, alternately stacked.

A shape of the body 110 is not particularly limited, but as illustrated, the body 110 may have a hexahedral shape or a similar shape. Due to shrinkage of a ceramic powder contained in the body 110 during a sintering process, the body 110 may have a substantially hexahedral shape, although a hexahedral shape having completely straight lines is not included.

The body 110 may have first and second surfaces 1 and 2 disposed opposite to each other in a thickness direction (a Z direction); third and fourth surfaces 3 and 4 connected to the first and second surfaces 1 and 2 and disposed opposite to each other in a length direction (an X direction); and fifth and sixth surfaces 5 and 6 connected to the first and second surfaces 1 and 2, connected to the third and fourth faces 3 and 4, and disposed opposite to each other in a width direction (a Y direction).

The plurality of dielectric layers 111 forming the body 110 may be in a sintered state, and boundaries between neighboring dielectric layers 111 may be integrated such that it is difficult to identify without using a scanning electron microscope (SEM).

According to one embodiment of the present disclosure, a raw material for forming the dielectric layer 111 is not particularly limited as long as a sufficient electrostatic capacity may be obtained. For example, a barium titanate-based material, a lead composite perovskite-based material, a strontium titanate-based material, or the like may be used.

A variety of ceramic additives, organic solvents, plasticizers, binders, dispersants, and the like may be added to powder particle of barium titanate ($BaTiO_3$), depending on the purpose of the present disclosure.

The body 110 may include a capacitance formation portion disposed inside the body 110 and including a first internal electrode 121 and a second internal electrode 122 arranged to face each other with the dielectric layer 111 interposed therebetween, to form capacitance; and cover portions 112 and 113 formed on and below the capacitance formation portion.

The capacitance formation portion may be a portion contributing to capacitance formation of a capacitor, and may be formed by repeatedly stacking the plurality of first and second internal electrodes 121 and 122 with the dielectric layer 111 interposed therebetween.

An upper cover portion 112 and a lower cover portion 113 may be formed by stacking a single dielectric layer or two or more dielectric layers on upper and lower surfaces of the capacitance formation portion in the vertical direction, respectively, and may function to basically prevent the internal electrodes from being damaged by physical or chemical stress.

The upper cover portion 112 and the lower cover portion 113 may not include internal electrodes, and may include the same material as the dielectric layer 111.

The plurality of internal electrodes 121 and 122 may be disposed to face each other with the dielectric layer 111 interposed therebetween.

The internal electrodes 121 and 122 may include a first internal electrode 121 and a second internal electrode 122, alternately arranged to face each other with a dielectric layer interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4, and may be exposed through the third surface 3, and the second internal electrode 122 may be spaced apart from the third surface 3, and may be exposed through the fourth surface 4. The first external electrode 131 may be disposed on the third surface 3 of the body and connected to the first internal electrode 121, and the second external electrode 132 may be disposed on the fourth surface 4 of the body and connected to the second internal electrode 122.

The first and second internal electrodes 121 and 122 may be electrically separated from each other by the dielectric layer 111 disposed in a middle portion.

Referring to FIGS. 3A and 3B, a body 110 may be formed by stacking alternatively and sintering a dielectric layer 111 on which a first internal electrode 121 is printed, and a dielectric layer 111 on which a second internal electrode 122 is printed, in the thickness direction (the Z direction).

Materials for forming the first and second internal electrodes 121 and 122 are not particularly limited, and may be formed by using a conductive paste including a noble metal material such as palladium (Pd), a palladium-silver (Pd—Ag) alloy, or the like, and one or more materials of nickel (Ni) and copper (Cu).

The conductive paste may be printed by a screen printing method or a gravure printing method, but the present disclosure is not limited thereto.

External electrodes 131 and 132 may be disposed on the body 110 and connected to the internal electrodes 121 and 122, respectively, and may include a first external electrode 131 and a second external electrode 132 connected to the first and second internal electrodes 121 and 122, respectively, as illustrated in FIG. 2.

The first and second external electrodes 131 and 132 may be electrically connected to the first and second internal electrodes 121 and 122, respectively, to form electrostatic capacitance, and the second external electrode 132 may be connected to a potential different from that of the first external electrode 131.

The external electrodes 131 and 132 may include electrode layers 131a and 132a connected to the internal electrodes 121 and 122, first conductive resin layers 131b and 132b disposed on the electrode layers, and second conductive resin layers 131c and 132c disposed on the first conductive resin layers.

The electrode layers 131a and 132a may include a conductive metal and a glass.

A conductive metal used for the electrode layers 131a and 132a is not particularly limited as long as it is a material that may be electrically connected to the internal electrodes for the formation of electrostatic capacitance, and may be, for example, one or more selected from the group consisting of copper (Cu), silver (Ag), nickel (Ni), and alloys thereof.

The electrode layers 131a and 132a may be formed by applying a conductive paste prepared by adding glass frit to a conductive metal powder and then sintering the paste.

The first and second conductive resin layers 131b, 132b, 131c, and 132c may include a metal powder and a base resin.

The metal powder may function to electrically connect to the electrode layers 131a and 132a, and the base resin may function to ensure adhesion and absorb impacts.

Since the first conductive resin layers 131b and 132b have a relatively lower metal powder content than the second conductive resin layers 131c and 132c, the first conductive resin layers 131b and 132b may increase the adhesion and the bending strength characteristics with the electrode layers 131a and 132a. Further, since the second conductive resin layers 131c and 132c have a relatively high metal powder content than the first conductive resin layers 131b and 132b, the adhesion with a plated layer may be improved, the non-plating phenomenon may be prevented, and the reliability may be improved.

Since the metal powder content of the first conductive resin layers 131b and 132b is relatively low, an equivalent series resistance (ESR) may be relatively high, and the electrical connectivity may be deteriorated. Further, since the metal powder content of the second conductive resin layers 131c and 132c is relatively high, the bending strength characteristics may be deteriorated.

According to one embodiment of the present disclosure, a content of the flake-type powder particle (f) in the first conductive resin layers 131b and 132b may be more than a content of the spherical-type powder particle (s) in the first conductive resin layers 131b and 132b. The first conductive resin layers 131b and 132b may increase a ratio of the flake-type powder particle (f), to maintain an effect of increasing the adhesion and the bending strength characteristics with the electrode layers 131a and 132a, to reduce the equivalent series resistance (ESR), and to improve the electrical connectivity. According to one embodiment of the present disclosure, a content of the spherical-type powder particle (s) in the second conductive resin layers 131c and 132c may be equal to or more than a content of the flake-type powder particle (f) in the second conductive resin layers 131c and 132c. The second conductive resin layers 131c and 132c may increase a ratio of the spherical-type powder particle (s), than the first conductive resin layers, to maintain an effect of improving the adhesion with the plated layer, and may increase the elasticity to improve the bending strength characteristics.

A metal powder (f and s) may include at least one of flake-type powder particle (f) and spherical-type powder particle (s). For example, the metal powder may be composed of only the flake-type powder particle, may be composed of only the spherical-type powder particle, or may be a mixture of the flake-type powder particle and the spherical-type powder particle.

The weight ratio of the flake-type powder particle (f) in the metal powders contained in the first conductive resin layers 131b and 132b may be 60% or more. Since the flake-type powder particle has an elongated shape, the electrical connectivity may be efficiently improved even with a relatively small electrical amount. The weight ratio of the flake-type powder particle (f) in the metal powders contained in the first conductive resin layers 131b and 132b may be more than the weight ratio of the spherical-type powder particle (s) in the metal powders contained in the first conductive resin layers 131b and 132b.

When the weight ratio of the flake-type powder particle in the metal powder contained in the first conductive resin layers 131b and 132b is less than 60%, the ESR may increase, and the electrical connectivity may deteriorate.

An upper limit of the weight ratio of the flake-type powder particle in the metal powders contained in the first conductive resin layers 131b and 132b is not particularly limited, and the weight ratio of the flake-type powder particle may be 100%. When the weight ratio of the flake-type powder particle is more than 95%, the appearance defect may occur, such that the upper limit thereof may be 95%. In one embodiment, the weight ratio of the flake-type powder particle (f) in the metal powder contained in the first conductive resin layers 131b and 132b is 65% or more, 70% or more, 75% or more, 80% or more, 85% or more, or 90% or more. In one embodiment, upper limit of the weight ratio of the flake-type powder particle (f) in the metal powder contained in the first conductive resin layers 131b and 132b is 90%, 85%, 80%, 75%, 70%, or 65%.

Although the flake-type powder particle is not particularly limited, a length ratio (major axis/minor axis) of a major axis to a minor axis may be, for example, 1.95 or more.

The weight ratio of the spherical-type powder particle (s) in the metal powder contained in the second conductive resin layers 131c and 132c may be 50% or more. The spherical-type powder particle may have relatively high elasticity, may absorb the external impact, and improve the bending strength. The weight ratio of the spherical-type powder particle (s) in the metal powder contained in the second conductive resin layers 131c and 132c may be equal to or more than the weight ratio of the flake-type powder particle (f) contained in the second conductive resin layers 131c and 132c.

When the weight ratio of the spherical-type powder particle in the metal powder contained in the second conductive resin layers 131c and 132c is less than 50%, the weight ratio of the spherical-type powder particle having excellent elasticity may become too low, and the bending strength may be lowered.

The upper limit of the weight ratio of the spherical-type powder particle in the metal powder contained in the second conductive resin layers 131c and 132c is not particularly limited, and the weight ratio of the spherical-type powder particle may be 100%. In one embodiment, the weight ratio of the spherical-type powder particle (s) in the metal powder contained in the second conductive resin layers 131c and 132c is 55% or more, 60% or more, 65% or more, 70% or more, 75% or more, 80% or more, 85% or more, 90% or more, or 95% or more. In one embodiment, upper limit of the weight ratio of the spherical-type powder particle (s) in the metal powder contained in the first conductive resin layers 131b and 132b is 95%, 90%, 85%, 80%, 75%, 70%, 65%, 60% or 55%.

Although the spherical-type powder particle is not particularly limited, a length ratio (major axis/minor axis) of a major axis to a minor axis may be, for example, 1.45 or less.

A method of measuring the lengths of the major axis and the minor axis of the spherical-type powder particle (s) and the flake-type powder particle (f) may be a method of measuring the X and Z directional cross-sections (an L-T cross-section) cut at a central portion in the width direction (the Y direction) of the capacitor component by a scanning electron microscope (SEM).

The metal powders (f and s) are not particularly limited as long as they may be electrically connected to the electrode layers 131a and 132a. For example, the metal powders (f and s) may include at least one selected from the group consisting of copper (Cu), silver (Ag), nickel (Ni), and alloys thereof.

A thickness (tc) of the second conductive resin layers may be 10% or more and 30% or less of a thickness (tb) of the first conductive resin layers. In one embodiment, the thickness (tc) of the second conductive resin layers is 15% or more, 20% or more, or 25% or more of the thickness (tb) of the first conductive resin layers. In one embodiment, the thickness (tc) of the second conductive resin layers is 25% or less, 20% or less, 15% or less of the thickness (tb) of the first conductive resin layers.

When the thickness (tc) of the second conductive resin layers is less than 10% or more than 30% of the thickness (tb) of the first conductive resin layer, internal stress generated by a difference in heat shrinkage ratio may act on a boundary, adhesion with the electrode layers 131a and 132a may not be sufficiently secured to have the lifting phenomenon, the electrical conductivity may be lowered, and the bending strength may not be sufficiently secured.

The content of the metal powder in the first conductive resin layers 131b and 132b may be 60 wt % or less in relation to a total weight of the first conductive resin layers 131b and 132b, respectively.

When the content of the metal powder in the first conductive resin layers 131b and 132b is more than 60 wt %, the adhesion with the electrode layers 131a and 132a may be lowered, and the lifting phenomenon may occur. A lower limit of the metal powder in the first conductive resin layers 131b and 132b is not particularly limited, but may be, for example, 20 wt % or more. In one embodiment, the content of the metal powder in the first conductive resin layer 131b and 132b is 55% wt % or less, 50 wt % or less, 45 wt % or less, 40 wt % or less, 35 wt % or less, 30 wt % or less, or 25 wt % or less. In one embodiment, the content of the metal powder in the first conductive resin layer 131b and 132b is 25 wt % or more, 30 wt % or more, 35 wt % or more, 40 wt % or more, 45 wt % or more, 50 wt % or more, or 55 wt % or more.

The content of the metal powder in the second conductive resin layers 131c and 132c may be 75 wt % or more in relation to a total weight of the second conductive resin layers 131c and 132c, respectively.

When the content of the metal powder in the second conductive resin layers 131c and 132c is less than 75 wt %, the conductivity may be lowered, the electrical connectivity may be lowered, the adhesion with the plated layers 131d and 132d may be lowered, and the non-plating phenomenon may occur.

An upper limit of the metal powder in the second conductive resin layers 131c and 132c is not particularly limited, but may be, for example, 95 wt % or less. In one embodiment, the content of the metal powder in the second conductive resin layer 131c and 132c is 80 wt % or more, 85 wt % or more, or 90 wt % or more. In one embodiment, the content of the metal powder in the second conductive resin layer 131c and 132c is 90 wt % or less, 85 wt % or less, or 80 wt % or less.

The base resin is not particularly limited as long as it has the adhesion and the impact-absorbing property and it is mixed with the conductive metal powder to form a paste. For example, the base resin may include an epoxy-based resin.

The base resin included in the first conductive resin layers 131b and 132b may have a relatively low Young's modulus and relatively high toughness and flexibility, to further improve crack resistance.

For example, the base resin included in the first conductive resin layers 131b and 132b may include one or more selected from the group consisting of an acryl resin, a urethane polymer, and a core-shell rubber.

Examples of the urethane polymer may be one obtained by reacting isophorone diisocyanate (IPDI), methylene diphenyl diisocyanate (MDI), 1,4-pentamethylene diisocyanate (1,4-PDI), 4,4'-methylene bis-(cyclohexyl isocyanate) (HMDI), or the like, and a polyol, which may be used alone or in combination of two or more among them.

The core-shell rubber may be a product sold under the name Kane Ace (manufactured by Kanegafuchi Kagaku Kogyo Kabushikikaisha), Paraloid (manufactured by Rohm and Haas Co., Ltd.), or the like.

The base resin included in the second conductive resin layers 131c and 132c for high temperature assurance may be a material having relatively high heat resistance, relatively low thermal conductivity, and relatively high adhesion and glass transition temperature.

For example, the base resin included in the second conductive resin layers 131c and 132c may include one or more selected from the group consisting of an ultra-high polymer resin, an oligomer resin, and a high heat-resistant epoxy resin.

For example, as the high heat-resistant epoxy resin, an epoxy resin having a rigid structure such as benzene, naphthalene, dicyclopentadiene, or the like, may be used. The ultra-high molecular weight resin has a molecular weight of 50,000 or more, and may be usually usable as long as it is applicable to a paste, and the type of resin is not particularly limited. The oligomer resin may be a resin having a molecular weight of 30,000 or less such as a polyester resin, a polyester amide resin, a phenoxy resin, or the like.

The external electrodes 131 and 132 may include first and second external electrodes 131 and 132, disposed on the third and fourth surfaces 3 and 4, respectively.

The first external electrode 131 may include a connection portion C disposed on the third surface of the body, and a band portion B extending from the connection portion to a portion of the first and second surfaces. Likewise, the second external electrode 132 may include a connection portion disposed on the fourth surface of the body, and a band portion extending from the connection portion to a portion of the first and second surfaces.

In this case, the band portion B may extend not only to a portion of the first and second surfaces 1 and 2, but also to a portion of the fifth and sixth surfaces 5 and 6, from the connection portion C.

Hereinafter, the first external electrode 131 will mainly be described, but the second external electrode 132 may have a configuration corresponding to the first external electrode 131.

Figure 5:
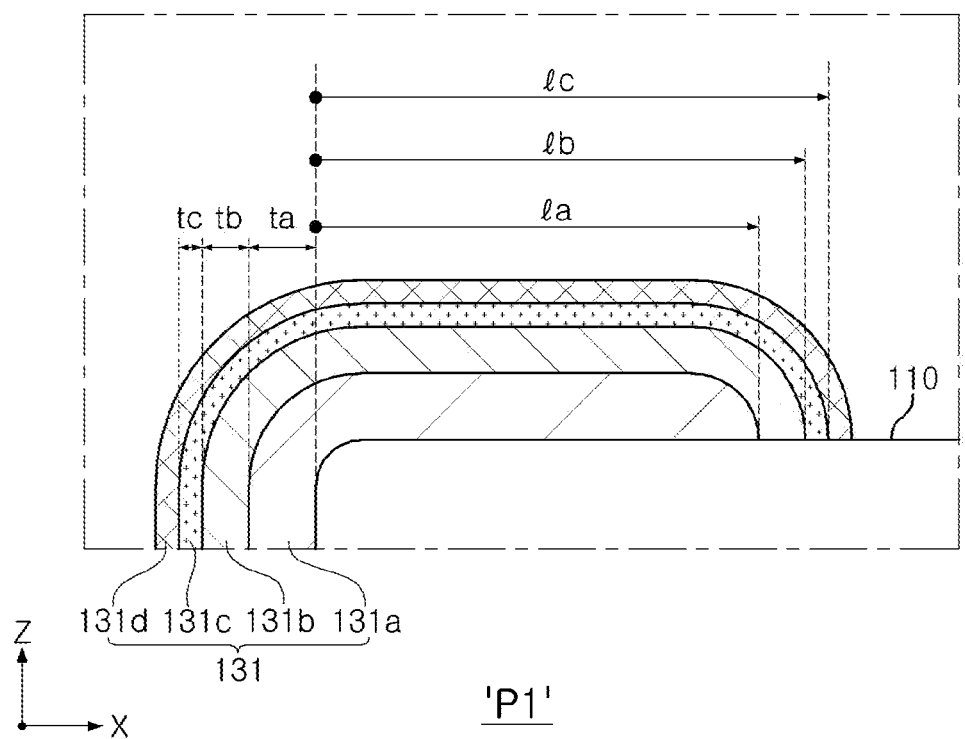
FIG. 5 is an enlarged view illustrating area P1 in FIG. 2.

Referring to FIG. 5, in the first conductive resin layer 131, a distance ($\ell b$) from the third surface 3 of the body 110 to an end of the band portion of the first conductive resin layers 131b may be 10 to 20 times the thickness (tb) of the first conductive resin layer. For example, $10*tb \leq \ell b \leq 20*tb$ may be satisfied.

When the distance ($\ell b$) is less than 10*tb, the bending strength may be deteriorated. When the distance ($\ell b$) is more than 20*tb, the external electrode may become too thick. Therefore, the capacity per unit volume may be lowered.

In addition, in the first external electrode 131, the distance ($\ell b$) from the third surface 3 of the body 110 to an end of the band portion of the first conductive resin layer 131b may be shorter than a distance ($\ell c$) from the third surface 3 of the body 110 to an end of the band portion of the second conductive resin layer 131c, and may be longer than a distance $\ell a$) from the third surface 3 of the body 110 to an end of the band portion of the electrode layer 131a.

For example, a relation of $\ell a < \ell b < \ell c$ may be satisfied, and the second external electrode 132 may have a shape corresponding to the first external electrode with respect to the fourth surface 4 of the body 110.

Therefore, the electrode layer 131a may completely cover the first conductive resin layers 131b, and the first conductive resin layers 131b may completely cover the second conductive resin layers 131c. As a result, the bending strength characteristics, and the adhesion between the external electrode and the body, may be enhanced.

The external electrodes 131 and 132 may further include plated layers 131d and 132d, disposed on the second conductive resin layers 131c and 132c, to improve the mounting characteristics.

For example, the plated layers 131d and 132d may be a Nickel (Ni) plated layer or a Tin (Sn) plated layer. The Ni plated layer and the Sn plated layer may be sequentially formed on the second conductive resin layers 131c and 132c, and a plurality of Ni plated layers and/or a plurality of Sn plated layers may be included.

Experimental Example

The following Table 1 illustrated a weight ratio of a spherical-type powder particle to a flake-type powder particle of a metal powder contained in first and second conductive resin layers, and a lifting phenomenon, occurrence of cracks, and an ESR due to a ratio (tc/tb) in a thickness of the second conductive resin layer to the first conductive resin layer.

The occurrence of cracks of the first and second conductive resin layers was described by preparing 100 samples per each test number, and, then, by observing the number of cracks when a sample was bent by 5 mm.

Thirty (30) samples were prepared for each test number, and immersed in 340° C. lead bath for 20 seconds. Next, the number of lifting phenomenon between electrode layers and the conductive resin layers was investigated.

The ESR was measured at resonance frequency using an impedance analyzer. When the impedance was 10 mΩ or less, it was indicated as "OK" which means acceptable.

When the impedance was more than 12 mΩ, it was indicated as "NG" which means not acceptable.

TABLE 1

| Test Nos. | 1st conductive resin layer Spherical: Flake | 2nd conductive resin layer Spherical: Flake | tc/tb (%) | lifting phenomenon | Number of Crack | ESR |
|---|---|---|---|---|---|---|
| 1 | 10:90 | 50:50 | 20 | 0 | 0 | OK |
| 2 | 20:80 | 60:40 | 20 | 0 | 0 | OK |
| 3 | 30:70 | 70:30 | 20 | 0 | 0 | OK |
| 4* | 0:100 | 50:50 | 50 | 20 | 8 | OK |
| 5* | 50:50 | — | 0 | 18 | 80 | OK |
| 6* | 60:50 | — | 0 | 75 | 56 | NG |
| 7* | 50:50 | 60:40 | 20 | 0 | 0 | NG |
| 8* | 30:70 | 40:60 | 20 | 0 | 10 | OK |

In the cases of Test Nos. 1 to 3, the weight ratio of the flake-type powder particle in the metal powder contained in the first conductive resin layers was 60% or more, and the weight ratio of the spherical-type powder particle in the metal powder contained in the second conductive resin layers was 50% or more. As a result, cracks did not occur, and the bending strength characteristics were excellent.

In the case of Test No. 4, the thickness (tc) of the second conductive resin layers exceeded 30% of the thickness (tb) of the first conductive resin layer, and the lifting phenomenon and cracks occurred.

In the cases of Test Nos. 5 and 6, the conductive resin layers were formed in a single-layer structure, instead of a conductive resin layers having a two-layer structure, and a relatively large amount of lifting phenomenon and cracks occurred.

In the case of Test No. 7, the ratio of the flake-type powder particle in the metal powder contained in the first conductive resin layers was less than 60%, and the ESR was relatively high.

In the case of Test No. 8, the ratio of the spherical-type powder particle in the metal powder contained in the second conductive resin layers was less than 50%, and the cracks occurred.

Therefore, when the ratio of the flake-type powder particle in the metal powder contained in the first conductive resin layers is 60% or more, and the ratio of the spherical-type powder particle in the metal powder contained in the second conductive resin layers is 50% or more, it is confirmed that the ESR was relatively low, and the bending strength characteristics were excellent.

While the present disclosure has been particularly illustrated and described with reference to example embodiments thereof, it can be to be understood that the present disclosure is not limited to the disclosed example embodiments, but on the contrary, is intended to cover various modifications and equivalent arrangements included within the spirit and scope of the appended claims. It will be apparent to those skilled in the art that various substitutions, changes, and modifications in form and details may be made therein without departing from the technical idea of the present disclosure as defined by the appended claims, and may be within the scope of the present disclosure.

According to an aspect of the present disclosure, a capacitor component formed with the conductive resin layers of the external electrode as two layers having different ratios of the flake-type powder particle and the spherical-type powder particle may be provided, to improve the crack resistance and lifting characteristics, and to lower the equivalent series resistance (ESR).

It should be understood, however, that the various and advantageous advantages and effects of the present disclosure are not limited to those described above, and can be more readily understood in the course of describing a specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A capacitor component comprising:
a body including dielectric layers and internal electrodes alternately arranged with the dielectric layers; and
external electrodes including electrode layers disposed on the body and connected to the internal electrodes, first conductive resin layers disposed on the electrode layers, and second conductive resin layers disposed on the first conductive resin layers,
wherein the first and second conductive resin layers include a metal powder and a base resin,
the first conductive resin layers have a lower metal powder content than the second conductive resin layers,
the metal powder includes flake-type powder particle and/or spherical-type powder particle, and
a weight ratio of the flake-type powder particle in the metal powder contained in the first conductive resin layers is 60% or more, and a weight ratio of the spherical-type powder particle in the metal powder contained in the second conductive resin layers is 50% or more.

2. The capacitor component according to claim 1, wherein the spherical-type powder particle has a length ratio (major axis/minor axis) of a major axis to a minor axis of 1.45 or less.

3. The capacitor component according to claim 1, wherein the flake-type powder particle has a length ratio (major axis/minor axis) of a major axis to a minor axis of 1.95 or more.

4. The capacitor component according to claim 1, wherein the metal powder comprises at least one selected from the group consisting of copper (Cu), silver (Ag), nickel (Ni), and alloys thereof.

5. The capacitor component according to claim 1, wherein a thickness of the second conductive resin layers are 10% or more and 30% or less of a thickness of the first conductive resin layers.

6. The capacitor component according to claim 1, wherein a content of the metal powder in the first conductive resin layers is 60 wt % or less, and a content of the metal powder in the second conductive resin layers is 75 wt % or more.

7. The capacitor component according to claim 1, wherein the base resin included in the first conductive resin layers comprises one or more selected from the group consisting of an acryl resin, a urethane polymer, and a core-shell rubber.

8. The capacitor component according to claim 1, wherein the base resin included in the second conductive resin layers comprises one or more selected from the group consisting of an ultra-high polymer resin, an oligomer resin, and a high heat-resistant epoxy resin.

9. The capacitor component according to claim 1, wherein the electrode layers comprise a conductive metal and a glass.

10. The capacitor component according to claim 1, wherein the external electrodes further comprise a plated layer disposed on the second conductive resin layers.

11. The capacitor component according to claim 10, wherein the plated layer is a nickel (Ni) plated layer or a tin (Sn) plated layer.

12. The capacitor component according to claim 1,
wherein the body comprises first and second surfaces disposed opposite to each other, third and fourth surfaces connected to the first and second surfaces and disposed opposite to each other, and fifth and sixth surfaces connected to the first to fourth surfaces and disposed opposite to each other,
the external electrodes comprise first and second external electrodes respectively disposed on the third and fourth surfaces, wherein the first and second external electrodes include a band portion extending to a portion of the first and second surfaces, and
in the first external electrode, a distance between the third surface and an end of the band portion in the first conductive resin layer is 10 to 20 times a thickness of the first conductive resin layer.

13. The capacitor component according to claim 12, wherein, in the first external electrode, the distance between the third surface and an end of the band portion in the first conductive resin layer is shorter than a distance between the third surface and an end of the band portion in the second conductive resin layer, and is longer than a distance between the third surface and an end of the band portion in the electrode layer.

14. The capacitor component according to claim 1, wherein the weight ratio of the flake-type powder particle in the metal powder contained in the first conductive resin layers is more than a weight ratio of the spherical-type powder particle in the metal powder contained in the first conductive resin layers.

15. The capacitor component according to claim 1, wherein the weight ratio of the spherical-type powder particle in the metal powder contained in the second conductive resin layers is equal to or more than a weight ratio of the flake-type powder particle in the metal powder contained in the second conductive resin layers.

* * * * *